United States Patent [19]

Carder

[11] 4,003,751

[45] Jan. 18, 1977

[54] COATING AND INK COMPOSITIONS

[75] Inventor: Charles H. Carder, Charleston, W. Va.

[73] Assignee: Union Carbide Corporation, New York, N.Y.

[22] Filed: Sept. 5, 1974

[21] Appl. No.: 503,476

[52] U.S. Cl. .............................. 106/20; 96/115 P; 106/287 R; 204/159.23
[51] Int. Cl.² ......................................... C09D 11/00
[58] Field of Search .................. 106/19, 20, 287 R; 204/159.15, 159.23, 159.19; 96/115 P

[56] References Cited

UNITED STATES PATENTS

| 3,479,328 | 11/1969 | Nordstrom | 260/72 R |
| 3,700,643 | 10/1972 | Smith et al. | 260/77.5 AN |
| 3,759,809 | 9/1973 | Carlick et al. | 204/159.23 |
| 3,840,369 | 10/1974 | Carlick et al. | 204/159.23 |
| 3,840,448 | 10/1974 | Osborn et al. | 204/159.19 |
| 3,871,908 | 3/1975 | Spoor et al. | 204/159.19 |

*Primary Examiner*—Lorenzo B. Hayes
*Attorney, Agent, or Firm*—Francis M. Fazio

[57] ABSTRACT

Compositions based on 2(N-alkylcarbamoyl) alkyl acrylate have been prepared which are useful as coatings and inks.

11 Claims, No Drawings

COATING AND INK COMPOSITIONS

BACKGROUND OF THE INVENTION

During the past decade, many efforts have been made to minimize the amount of volatile materials that escape into the atmosphere when an ink or coating composition has been applied to a substrate. Many compositions have been prepared in which the undesirable volatile solvent is decreased or completely eliminated. One of the problems associated with this approach has been an increase in the viscosity of the ink or coating presenting problems in its handling and application. It is therefore desirable to produce compositions having the proper viscosity. It is also desirable to produce compositions which can be cured rapidly with a minimal consumption of energy. To effect this goal recent improvements in the coatings and ink field have led to compositions which can be cured by radiation means or with a minimal amount of heat energy. Illustrative are compositions and procedures as are described in U.S. Pat. No. 3,700,643 and U.S. Pat. No. 3,759,807.

The use of alkylcarbamoyl alkyl acrylates in coating and ink compositions have been found to impart to them many desirable properties. These alkylcarbamoyl alkyl acrylates are known and have been disclosed in U.S. Pat. No. 3,479,328 and U.S. Pat. No. 3,674,838.

SUMMARY OF THE INVENTION

The present invention provides coating and ink compositions that are essentially free of volatile solvents and which can be cured to the dry state by any of the known radiation and thermal processes.

The compositions of this invention comprise a mixture of (a) at least one monofunctional acrylateurethane or alkylcarbamoyl alkyl acrylate, (b) at least one polyfunctional acrylate-urethane and, optionally, (c) at least one polyfunctional acrylate crosslinker and/or (d) at least one monofunctional acrylate as these are hereinafter defined.

When the coating or ink composition is to be cured by thermal means a free radical initiator is also desirably present; when cure is by light radiation, such as ultraviolet radiation, the presence of a photoinitiator or photosensitizer is desirable; and when the composition is to be cured by electron radiation procedures the presence of such materials is not necessary; though one can, if desired, include a free radical initiator. While the compositions are essentially free of solvents one can, if desired, include a small amount thereof.

DESCRIPTION OF THE INVENTION

As previously indicated, the coating and ink compositions of this invention must contain at least two essential components, the monofunctional acrylate-urethane and the polyfunctional acrylate-urethane, and they can also optionally contain other indicated materials. These compositions can be readily applied to a substrate by any of the known application means and can then be cured to a dry, tack-free state by any of the known curing means. The methods of application or cure are not the subject of this invention and any of the known methods can be used. In fact, these procedures are so numerous and so well known that a detailed explanation thereof is considered unnecessary. Thus, they can be applied by printing equipment, roll coating, dip coating, spraying, brushing, knife coater, curtain coater, or any other method depending upon the equipment available and the ultimate goal of the user. The method for cure can also vary and one can use an electron beam, ultraviolet light or thermal cure. Cure can be carried out under normal atmospheric conditions or under an inert gas atmosphere. As is known to those skilled in the art the amount of time required for cure will vary depending upon the curing method used, the thickness of the film, the particular reactants present and other variables that may be introduced into the composition or the process. Those skilled in the art can readily adjust the conditions to obtain a satisfactory end product.

The substrates that can be coated or printed with the compositions of this invention can be any organic or inorganic, natural or synthetic material. Thus, they can be applied to paper, cloth, wood, metal, fibers, woven or nonwoven, plastic films and sheets, for example, vinyl tiles, vinyl-asbestos tiles, or to simulated woods, such as grain-printed particleboard or chipboard, or printed or decorated surfaces.

For simplicity, the term acrylate as used in this application shall include all of the organic esters of acrylic acid and the organic esters of methacrylic acid, whether aliphatic or aromatic and whether or not substituted with other groups such as halogen, cyano, hydroxyl, t-amino, or any other group which would not interfere with the cure or have an unduly deleterious effect on the finished coating.

The monofunctional acrylate-urethane or alkylcarbamoyl alkyl acrylate useful in the compositions of this invention are those represented by the formula:

wherein Z is hydrogen or methyl; X is a linear or branched divalent alkylene of 1 to 10 carbon atoms, preferably 1 to 6 carbon atoms, cycloalkylene of 5 to 12 carbon atoms, preferably 6 to 8 carbon atoms, or arylene of 6 to 12 carbon atoms; and R is a linear or branched alkyl of 1 to 10 carbon atoms, preferably 1 to 6 carbon atoms, cycloalkyl of 5 to 12 carbon atoms, preferably 6 to 8 carbon atoms, or aryl of 6 to 12 carbon atoms. The X and R groups can be unsubstituted or substituted. Illustrative thereof one can mention 2(N-methylcarbamoyl) ethyl acrylate, 2(N-butyl-carbamoyl) ethyl acrylate, 2 (or 3)(N-methylcarbamoyl) butyl acrylate, 2(N-phenylcarbamoyl)ethyl acrylate, 2(N-methylcarbamoyl)-propylacrylate, 2(N-cyclohexylcarbamoyl)ethyl acrylate, p(N -methylcarbamoyl)phenyl acrylate, 3(N-methylcarbamoyl)-cyclohexyl acrylate, and the like; as well as the methacrylates thereof. The preferred monofunctional acrylateurethanes are 2(N-methylcarbamoyl)ethylacrylate and 2(N-methylcarbamoyl)propyl acrylate.

The monofunctional acrylate-urethane is present in the coating or ink composition at a concentration of from about 1 to 80 weight percent; the preferred concentration for an ink composition is from about 1 to 15 weight percent and for a coating composition it is from about 20 to 50 weight percent.

The polyfunctional acrylate-urethane present in the ink or coating composition can be a polycaprolactone-polyurethane-polyacrylate oligomer or a diurethanediacrylate or a urea-urethane-polyacrylate oligomer. The preferred polycaprolactone-polyurethanepolyacrylate oligomers are the polycaprolactone-diurethane-diacrylate oligomers.

The polycaprolactone-polyurethane-polyacrylates are those compounds disclosed in U.S. Pat. No. 3,700,643, the disclosure of which is incorporated herein by reference. They are the reactions of a polycaprolactone polyol, an organic polyisocyanate and a hydroxyl substituted organic ester of acrylic acid or methacrylic acid, which ester can be aliphatic, cycloaliphatic or aromatic. The hydroxyl substituted esters are the same as those hereinafter defined. Among the suitable organic polyisocyanates are those hereinafter defined. The polycaprolactone polyols are known compounds and they can be diols, triols, tetrols or of higher hydroxyl functionality. The preferred are the diols and triols. Many polycaprolactone polyols are commercially available and are fully disclosed in U.S. Pat. No. 3,169,945.

As described therein the caprolactone polyols are produced by the catalytic polymerization of an excess of the caprolactone compound with an organic functional initiator having at least one reactive hydrogen atom; the polyols can be single compounds or mixtures of compounds, either can be used in this invention. The method for producing the caprolactone polyols is of no consequence. The organic functional initiators can be any hydroxyl compound, as shown in U.S. Pat. No. 3,169,945, and include diols such as ethylene glycol, diethylene glycol, triethylene glycol, 1,2-propylene glycol, dipropylene glycol, 1,3-propylene glycol, polyethylene glycol, polypropylene glycol, poly(oxyethylene-oxypropylene) glycols and similar polyalkylene glycols, either block, capped or heteric, containing up to about 40 or more alkyleneoxy units in the molecule, 3-methyl-1,5-pentanediol, cyclohexanediol, 4,4'-methylene-biscyclohexanol, 4,4'-isopropylidenebiscyclohexanol, xylendiol, 2-(4-hydroxymethylphenyl)-ethanol, and the like; triols such as glycerol, trimethylolpropane, 1,4-butanediol, 1,2,6-hexanetriol, triethanolamine, triisopropanolamine, and the like; tetrols such as erythritrol, pentaerythritol, N,N,N',N'-tetrakis-(2-hydroxyethyl)ethylenediamine, and the like.

When the organic functional initiator is reacted with the caprolactone a reaction occurs that can be represented in its simplest form by the equation:

$$R''(OH)_x + O=C(CR'_2)_4CHR' \longrightarrow$$
$$\underset{O\underline{\phantom{xxxxx}}}{\phantom{xx}}$$

$$R''\left(\left[\overset{O}{\underset{\|}{OC(CR'_2)_4CHR'}}\right]_m OH\right)_x$$

In this equation the organic functional initiator is the R''—(OH)$_x$ compound and the caprolactone is the $$O=C(CR'_2)_4CHR'$$
$$\underset{O\underline{\phantom{xxxxx}}}{\phantom{xx}}$$

compound; this can be caprolactone itself or a substituted caprolactone wherein R' is an alkyl, alkoxy, aryl, cycloalkyl, alkaryl or aralkyl group having up to twelve carbon atoms and wherein at least six of the R' groups are hydrogen atoms, as shown in U.S. Pat. No. 3,169,945. The polycaprolactone polyols that are used are shown by the formula on the right hand side of the equation; they can have a molecular weight of from 130 to about 20,000. The preferred caprolactone polyol compounds are those having a molecular weight of from about 175 to about 2,000. The most preferred are the polycaprolactone diol compounds having a molecular weight of from about 175 to about 500 and the polycaprolactone triol compounds having a molecular weight of from about 350 to about 1,000; these are most preferred because of their low viscosity properties. In the formula m is an integer representing the average number of repeating units needed to produce the compound having said molecular weights.

The diurethane-diacrylates are the reaction products of two moles of a hydroxy/substituted organic ester of acrylic acid or methacrylic acid with one mole of a diisocyanate. The hydroxy/substituted esters that are used are those represented by the formula:

$$\underset{CH_2=CCOOXOH}{\overset{Z}{|}}$$

wherein Z and X are as herebefore defined. Illustrative thereof one can mention 2-hydroxyethyl acrylate, 2 (or 1)-hydroxypropyl acrylate, 2 (or 1)-hydroxybutyl acrylate, p-hydroxyphenyl acrylate, 4-hydroxycyclohexyl acrylates, and the methacrylates thereof. Any of the known organic diisocyanates can be used and illustrative thereof one can mention 2,4-(or 2,6-) tolylene diisocyanate, 3-isocyanatomethyl -3,5,5-trimethylcyclohexyl isocyanate, diphenylmethane diisocyanate, 2,2,4-trimethylhexamethylene diisocyanate, dianisidine diisocyanate, xylylene diisocyanates, hexamethylene diisocyanate, dicyclohexyl-4,4'-methane diisocyanate, as well as any of the other known organic isocyanate.

The urea-urethane-polyacrylate oligomers are those compounds obtained by the reaction of a hydroxy substituted organic ester of acrylic acid or methacrylic acid as hereinbefore defined, an organic diisocyanate as hereinbefore defined and a hydroxylamine of the formula:

HOR'NHR wherein R' is a linear or branched divalent alkylene group of from 1 to 12 carbon atoms, cycloalkylene of 5 to 12 carbon atoms or arylene of 6 to 12 carbon atoms and R is as previously defined.

Illustrative of suitable hydroxylamines one can mention aminoethanol, the aminopropanols, the aminobutanols, the aminohexanols, the aminodecanols, methyl ethanolamine, the aminocyclohexanols, aminobenzyl alcohol, or any other amino alcohol.

In producing the urea-urethane-polyacrylate oligomers the amount of each reactant used is selected so that the theoretical number of equivalents of isocyanato groups charged to the reaction mixture is from about 80 percent to about 105 percent of the sum total of the number of equivalents of hydrogen atoms reacted therewith that are present in the hydroxyl and amino groups in the hydroxylamine and in the hydroxy substituted ester of acrylic acid or methacrylic acid. Preferably the number of equivalents of isocyanato groups is from 95 to 100 percent thereof. When the polyisocyanate contains more than two isocyanato groups and is a tri-or tetra-or higher isocyanate then one can produce a crosslinked product. The preferred compositions are those which are produced with the diisocyanates since they are less viscous. In practice an excess of the hydroxyhydrocarbyl acrylate or hydroxy substituted acrylic acid ester is preferably used since it can also serve as a solvent medium for the reaction.

Theoretically though applicant does not intend to be bound thereby, the primary reaction product obtained by the reaction of a hydroxyhydrocarbyl acrylate (HAA), a diisocyanate (DI) and a hydroxylamine (HA) can be represented by the general structure

wherein $n$ is an integer having a value of from 1 to 10, preferably from 1 to 3. Thus, the unit HAA has the structure

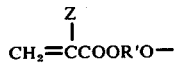

The unit DI has the structure

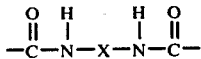

wherein X is a residue of the isocyanate compound and the unit HA represents the structure

when a triisocyanate or higher functional isocyanate is used the crosslinked structure presents a more complicated formula and those skilled in the art are well able to write these out. The molecular weight of the product can be controlled by controlling the ratio of hydroxyhydrocarbyl acrylate to hydroxylamine charged to the reaction mixture. The greater the amount thereof the lower the molecular weight since the hydroxyhydrocarbyl acrylate acts as a chain terminator for the reaction.

The reaction can be carried out in the presence of a solvent to facilitate stirring and as solvent one can use any conventional solvent or an intermediate which is desirably present in the subsequently formulated coating or ink but which does not interfere with the reaction at the present time. The reaction is carried out at a temperature of from about 10° to 75° C., preferably from 20° to 50° C. The time required will vary depending upon the specific reactants employed, the temperature, the size of the batch and other variables. Those skilled in the art are fully familiar with the effects of these variables and will know when to stop the reaction.

Normally a catalyst is present for the urethane reaction for the production of the urea-urethane polyacrylate oligomers at the conventional concentration known to those skilled in the art. The catalysts and the concentrations to be used are known to vary depending upon the particular amine or tin catalyst employed.

These catalysts are so well known that they should not require more than a brief mention. They include triethylene diamine, morpholine, N-ethyl-morpholine, piperazine, triethanolamine, triethylamine, N,N,N',N'-tetramethylbutane-1,3-diamine, dibutyltin dilaurate, stannous octoate, stannous laurate, dioctyltin diacetate, lead octoate, stannous oleate, stannous tallate, dibutyltin oxide, etc.

The polyfunctional acrylate-urethane is present in the coating or ink compositions at a concentration of from about 20 to 99 weight percent, preferably from about 30 to 60 weight percent. Illustrative thereof are the reaction products of (a) equimolar amounts of 2-hydroxyethyl acrylate (HEA), trimethyl-hexamethylene diisocyanate and 2-hydroxypropyl acrylate (HPA); (b) equimolar amounts of HEA, isophorone diisocyanate (IPDI) and HPA; (c) one mole of the polycaprolactone diol obtained by the reaction of epsilon-caprolactone with diethylene glycol having an average molecular weight of about 500, two moles of IPDI and two moles of HEA; (d) one mole of the same polycaprolactone diol, two moles of an 80/20 mixture of 2,4- and 2,6- tolylene diisocyanates, one mole of HEA and one mole of HPA; (e) one mole of the polycaprolactone triol obtained by the reaction of epsilon-caprolactone with glycerol having an average molecular weight of about 540, three moles of IPDI and three moles of HEA; (f) one mole of a polyoxypropylene diol having an average molecular weight of about 300, two moles of IPDI and two moles of HEA; (g) one mole of ethanolamine, two moles of IPDI and 2 moles of HEA.

The coating or ink composition can also contain from 0 to 50 weight percent, preferably from 10 to 30 weight percent of at least one polyfunctional acrylate crosslinker. These polyfunctional acrylate crosslinkers are any of the di-, tri-, or tetra-acrylate esters of acrylic acid or methacrylic acid with the di-, tri-, or tetra-alcohols. They are well known compounds and include for example, neopentyl glycol diacrylate, the diacrylate of 2,2-dimethyl-3-hydroxypropyl 2, 2-dimethyl-3-hydroxy propionate, 1,6-hexanediol diacrylate, pentaerythritol triacrylate, pentaerythritol tetraacrylate, diethylene glycol diacrylate, ethylene glycol diacrylate, trimethylol propane triacrylate, or the methacrylates thereof.

The preferred polyfunctional acrylate crosslinkers are neopentyl glycol diacrylate, 1,6-hexanediol diacrylate, diethylene glycol diacrylate and pentarethritol tri-/tetra-acrylate.

The carbamoyl-free monofunctional acrylate can be present at a concentration of from about 0 to 30 weight percent of the coating or ink composition, preferably from 5 to 20 weight percent. These monofunctional acrylates are any of the esters of acrylic acid or methacrylic acid and they are well known to those skilled in the art. Illustrative thereof one can mention methyl acrylate, the propyl acrylates, the butyl acrylates, the hexylacrylates, 2-ethylhexyl acrylate, decyl acrylate, cyclohexyl acrylates, phenyl acrylate, benzyl acrylate, tolyl acrylate, as well as those hydroxyl substituted esters of acrylic or methacrylic acid hereinbefore set forth, methoxyethyl acrylate, ethoxyethyl acrylate, butoxyethyl acrylate, phenoxyethyl acrylate, glycidyl acrylate, or any other known monoacrylate, as well as the methacrylate derivatives of any of the enumerated compounds.

The coating or ink compositions can additionally contain any of the conventional stabilizers, flow control agents, slip-aids, fillers, pigments, or other additives known to those skilled in the art to be useful in coating and ink formulations. In addition, one can also include a small amount of conventional solvent if this is desired. However, such addition would detract to some extent in that it presents an air pollution problem if it is a volatile solvent. In those instances in which the coating or ink is to be cured by light radiation means, the composition can contain from 0.1 to 20 weight percent of a photoinitiator or photosensitizer. Any of the known photoinitiators or photosensitizers can be used and as examples thereof, one can mention benzophenone, diethoxyacetophenone, the ethyl and butyl benzoin ethers, mixtures of benzophenone with amines such as methyl diethanolamine, or any other known photoinitiator.

Where the coating or ink composition is to be cured by thermal or electron methods, the presence of a free radical initiator at a concentration of from 0.1 to 5 weight percent is advantageous. Illustrative thereof one can mention benzoyl peroxide, di-t-butyl peroxide, t-butyl hydroperoxide, azo-bis-isobutyronitrile, isopropyl peroxide, or any other free radical initiator.

When cure is by electron beam, the use of an initiator is optional.

The compositions of this invention are produced by mixing the components to be used by conventional mixing or blending procedures. These conditions are well known to those skilled in the art and require no elaboration herein since there is nothing critical in the mixing procedure employed.

In a typical embodiment (a) 30 parts of 2(N-methylcarbamoyl) ethyl acrylate, (b) 35 parts of the oligomer obtained by the reaction of 540 parts of the polycaprolactone triol obtained by the reaction of epsiloncaprolactone with glycerol having an average molecular weight of about 540 with 348 parts of tolylene diisocyanate and 232 parts of 2-hydroxyethyl acrylate, (c) 20 parts of neopentyl glycol diiacrylate and (d) 15 parts of 2-ethylhexyl acrylate and 2 parts of n-butyl ether of benzoin as photoinitiator are mixed at ambient temperature until uniform. This composition when coated on a metal or wood substrate cures to a hard uniform film upon exposure to ultraviolet light radiation under a nitrogen atmosphere.

The following examples further serve to illustrate the invention; parts are by weight unless otherwise indicated.

EXAMPLE 1

There were charged to a flask 222 grams of isophorone diisocyanate, 167 grams of 2(N-methylcarbamoyl)ethyl acrylate as solvent (MCEA) and 0.5 gram of dibutyltin dilaurate. This was heated to 50° C. Then 30.5 grams of 2-aminoethanol was added over a period of 17 minutes in a dropwise manner while controlling the temperature at about 50° C. The reaction was stirred an additional 2.75 hours at 50° C. until the exothermic reaction appeared to have terminated. Over an 80 minutes period 135 grams of 2-hydroxyethyl acrylate was added while maintaining a temperature of about 50° C. The mixture was then stirred for an additional 1.25 hours at 50° C. and permitted to cool to room temperature. The product was a 70 percent solution of the acrylate-terminated urea-urethane oligomer in the solvent.

A radiation curable composition was produced by mixing 11.43 parts of the above oligomer solution, 3.77 parts of 2(N-methylcarbamoyl) ethyl acrylate, 4.8 parts of neopentyl glycol diacrylate and 0.4 part of a mixture of the n- and iso- butyl ethers of benzoin as photoinitiator. This composition had a Gardner-Holdt viscosity of U. A thin film was coated on to Bonderite No. 37 steel and cured by exposure to the continuum light radiation from an 18 kilowatt argon swirl-flow plasma arc for 0.6 second. The cured film was about one mil thick; it had a Sward Hardness of 56, acetone resistance more than 300 seconds and a Taber Wear factor of 2.8 using CS-17 wheels and one kilogram weights for 200 cycles with the wear results reported in milligrams of weight loss per 100 cycles. Impact resistance and adhesion values were low. Similar results were obtained when irradiated for 0.15 second.

EXAMPLE 2

A radiation curable composition was produced using 14.29 parts of the oligomer solution of Example 1, 1.71 parts of 2(N-methylcarbamoyl) ethyl acrylate, 4.0 parts of neopentyl glycol diacrylate and 0.4 part of the same photoinitiator. The coating composition had a Gardner-Holdt viscosity of Z1. The coating cured as in Example 1 had a Sward Hardness of 50, acetone resistance more than 300 seconds and a Taber Wear factor of 2.3. Similar results are obtained when irradiated for 0.15 second.

EXAMPLE 3

Following the procedure similar to that of Example 1, a mixture of 900 grams of trimethylhexamethylene diisocyanate, 668 grams of 2(N-methylcarbamoyl) ethyl acrylate as solvent and 2 grams of dibutyl tin dilaurate was initially reacted with 122 grams of 2-aminoethanol and then with 540 grams of 2-hydroxyethyl acrylate over a period of about 6.5 hours, and then allowed to cool. The product was a 70 percent solution of the acrylate-terminated urea-urethane oligomer in the solvent.

A radiation curable composition was produced by mixing 45.7 parts of the above oligomer solution, 16.3 parts of 2(N-methylcarbamoyl) ethyl acrylate, 25 parts of neopentyl glycol diacrylate, 7 parts isodecyl acrylate, 6 parts of 2-hydroxyethyl acrylate, 7 parts of silica flatting agent and 2 parts of a mixture of the n- and iso- butyl ethers of benzoin as photoinitiator. This composition had a Gardner-Holdt viscosity of C. The composition was applied to a vinyl asbestos tile heated to 82° C. and then cured as described in Example 1. The cured coating was about 3 mils thick; it had a Sward Hardness of 20, a 60° Gardner Gloss of 63, a Taber Wear factor of 18.3 milligrams loss per 500 cycles and a 100 percent crosshatch adhesion value.

EXAMPLE 4

A radiation curable composition was produced using 55.7 parts of the oligomer solution of Example 3, 13.3 parts of 2(N-methylcarbamoyl) ethyl acrylate, 25 parts of neopentyl glycol diacrylate, 6 parts of 2-hydroxyethyl acrylate, 7 parts of the silica flatting agent and 2 parts of the photoinitiator. The composition had a Gardner-Holdt viscosity of I. The coating cured as in Example 3 had a Sward Hardness of 16, a 60° Gardner Gloss of 58, a Taber Wear factor of 18.5 mgm/500 cycles and a 90 percent crosshatch adhesion value.

EXAMPLE 5

A series of curable compositions was produced containing the following parts by weight:

|  | A | B |
|---|---|---|
| Oligomer of Ex. 3 | 18.29 | 18.29 |
| MCEA | 6.51 | 0.51 |
| Neopentyl glycol diacrylate | 10.00 | 10.00 |
| Isodecyl acrylate | 2.80 | 2.80 |
| 2-Hydroxyethyl acrylate | 2.40 | 8.40 |
| Silica filler | 2.80 | 2.80 |
| Photoinitiator of Ex. 3 | 0.80 | 0.80 |
| Gardner-Holdt viscosity | D | A-B |

The compositions were coated on to vinyl asbestos tile at room temperature and cured by exposure in air to UV irradiation from six 2.2 kilowatt medium pressure mercury lamps for about one second followed by exposure under nitrogen to irradiation of 2,537 Angstroms from low pressure mercury lamps for about one second. The dry, cured films were about 3 mils thick and had the following properties:

|  | A | B |
|---|---|---|
| Sward Hardness | 16 | 12 |
| 60° Gardner Gloss | 64 | 52 |
| Taber Wear, 100 cycles | 7.6 | 8.1 |

EXAMPLE 6

This series shows the viscosity reducing effect of 2(N-methylcarbamoyl) ethyl acrylate in a coating composition when it is used to replace a portion of the oligomer. Surprisingly, the physical properties were not unduly affected and, in fact, impact properties were greatly improved.

A polycaprolactone-polyurethane-polyacrylate oligomer was prepared by reacting 5,450 parts of polycaprolactone triol having an average molecular weight of about 540 that was produced by the reaction of epsiloncaprolactone with glycerol, 5,225 parts of an 80/20 mixture of 2,4- and 2,6- tolylene diisocyanate and 7,030 parts of 2-hydroxyethyl acrylate in the presence of a catalyst. Initially 2,088 parts of the 2-hydroxyethyl acrylate was reacted with the tolylene diisocyanate; this was followed by the addition of the polycaprolactone triol and then by the addition of 1,392 parts of the 2-hydroxyethyl acrylate. After 4 hours at about 30° C. the remaining 3,550 parts of 2-hydroxyethyl acrylate was added. The product was an 80 percent solution of the oligomer in 2-hydroxyethyl acrylate.

A series of curable compositions was produced containing the following parts by weight:

|  | A | B | C | D |
|---|---|---|---|---|
| Oligomer of Ex. 6 | 40 | 30 | 20 | 20 |
| Neopentyl glycol diacrylate | 25 | 25 | 15 | 33.4 |
| 2-Hydroxyethyl acrylate | 15 | 15 | 15 | 20.0 |
| 2-Ethylhexyl acrylate | 20 | 20 | 20 | 26.6 |
| MCEA | — | 10 | 20 | — |
| Gardner-Holdt viscosity | G-H | — | A2 | A3 |
| Photoinitiator of Ex. 3 | 2 | 2 | 2 | 2 |

The compositions were coated on Bonderite No. 37 steel panels and cured by the procedure described in Example 1 under a nitrogen atmosphere using an exposure time of about 1.7 to 1.9 seconds. The films had the following properties:

|  | A | B | C | D |
|---|---|---|---|---|
| Sward Hardness | 20 | 24 | 10 | 24 |
| Taber Wear, 100 cycles | 1.8 | 1.8 | 2.9 | 7.1 |
| Reverse Impact, in-lb | 15 | 110 | 120 | — |
| Stain Resistance | Exc | Exc | Exc | Good |

The results show that replacement of the urethane oligomer by MCEA in compositions B and C lowered the viscosity as compared to control composition A. At the same time, however, the impact properties of compositions B and C of this invention improved vastly and there was no loss of abrasion resistance properties. Control composition D, which closely resembles composition C but which does not contain any MCEA had much poorer abrasion resistance.

EXAMPLE 7

An oligomer was prepared by charging 450 parts of trimethylhexamethylene triisocyanate, 530 parts of 2(N-methylcarbamoyl) ethyl acrylate as solvent and 0.89 part of dibutyl tin dilaurate to a reactor and heating to about 50° C. Then, over a 30 minutes period the following reactants were added in the sequence stated; 270 parts of the polycaprolactone triol used in Example 6, 118 parts 2-hydroxyethyl acrylate, 270 parts of the polycaprolactone triol described in Example 6 and 130 parts of 2-hydroxyethyl acrylate. Thereafter the reaction was stirred at 50° to 55° C. for 4.5 hours and let stand to cool. The product was a 70 weight percent solution of the oligomer in the solvent.

The above oligomer solution was further diluted in one series of compositions with additional quantities of 2(N-methylcarbamoyl) ethyl acrylate (Series I). In a second series the same original oligomer solution was diluted with a 50/50 weight mixture of 2-hydroxyethyl acrylate and 2-ethylhexyl acrylate (Series II). The purpose was to compare hardness and abrasion resistance of coating compositions diluted with 2(N-methylcarbamoyl) ethyl acrylate to coating compositions diluted with the other acrylates. It was also found that a comparison made on equal coating viscosity rather than on weight percent acrylate dilution, films produced using 2(N-methylcarbamoyl) ethyl acrylate as the diluent possessed better hardness and abrasion resistance properties. The coatings were applied to Bonderite No. 37 steel panels and cured by the procedure described in Example 6 using a 1.2 seconds radiation exposure period. The coatings contained 2 weight percent of the initiator described in Example 3.

| Series I | | | | | | |
|---|---|---|---|---|---|---|
| % MCEA added to Oligomer solution | 0 | 10 | 20 | 30 | 40 | 50 |
| Pencil Hardness | F | F | F | F | F | F |

| Series I | | | | | | |
|---|---|---|---|---|---|---|
| Taber Wear, 100 cycles | 1.3 | 2.1 | 2.4 | 2.7 | 3.3 | 3.7 |

| Series II | | | | | | |
|---|---|---|---|---|---|---|
| % HEA/2-EHA added to Oligomer solution | 0 | 10 | 20 | 30 | 40 | 50 |
| Pencil Hardness | F | F | B | 2B | 6B | 6B |
| Taber Wear, 100 cycles | 1.5 | 2.9 | 25.7 | 47 | 60 | 72 |

What is claimed is:

1. A coating or ink composition comprising:
   a. from 1 to 80 weight percent of at least one monofunctional acrylate-urethane of the formula:

$$\underset{\underset{CH_2=CCOOXOOCNHR}{|}}{Z}$$

wherein Z is hydrogen or methyl; X is divalent alkylene of 1 to 10 carbon atoms, cycloalkylene of 5 to 12 carbon atoms; and R is alkyl of 1 to 10 carbon atoms, cycloalkyl of 5 to 12 carbon atoms, or aryl of 6 to 12 carbon atoms;
   b. from 20 to 99 weight percent of at least one polyfunctional acrylate-urethane of the group: i. polycaprolactone-polyurethane-polyacrylate oligomers, said oligomers being the reaction product of polycaprolactone polyol having a molecular weight of from 130 to 20,000, organic polyisocyanate and hydroxyl substituted ester of the formula:

$$\underset{\underset{CH_2=CCOOXOH}{|}}{Z}$$

ii. diurethane-diacrylate, said compound being the reaction product of two moles of a hydroxyl substituted ester of the formula:

$$\underset{\underset{CH_2=CCOOXOH}{|}}{Z}$$

and one mole of an organic diisocyanate, or,
   iii. urea-urethane-polyacrylate oligomer said oligomer being the reaction product of a hydroxyl substituted ester of the formula:

$$\underset{\underset{CH_2=CCOOXOH}{|}}{Z}$$

an organic diisocyanate and a hydroxylamine of the formula:

HOR'NHR wherein R' is a linear or branched divalent alkylene of 1 to 12 carbon atoms, cycloalkylene of 5 to 12 carbon atoms, or arylene of 6 to 12 carbon atoms and Z and X are as hereinabove defined;
   c. from 0 to 50 weight percent of at least one polyfunctional acrylate crosslinker; and
   d. from 0 to 30 weight percent of at least one monofunctional acrylate.

2. A composition as claimed in claim 1, wherein X in said monofunctional acrylate-urethane is the divalent alkylene group of 1 to 6 carbon atoms and R is alkyl of 1 to 6 carbon atoms.

3. A composition as claimed in claim 1, wherein the monofunctional acrylate-urethane is 2(N-methylcarbamoyl)ethyl acrylate.

4. A composition as claimed in claim 1, wherein the monofunctional acrylate-urethane is 2(N-methylcarbamoyl)propyl acrylate.

5. A composition as claimed in claim 1, wherein said component (b) (i) is the polycaprolactone-diurethane-diacrylate reaction product of a polycaprolactone polyol, an organic diisocyanate and a hydroxyl substituted ester of acrylic acid or methacrylic acid.

6. A composition as claimed in claim 1, wherein said component (b) (ii) is the reaction product of two moles of a hydroxyl substituted ester of acrylic acid or methacrylic acid with one mole of an organic diisocyanate.

7. A composition as claimed in claim 1, wherein said component (b) (iii) is the reaction product of a hydroxyl substituted ester of acrylic acid or methacrylic acid, an organic diisocyanate and a hydroxylamine.

8. A composition as claimed in claim 1, wherein said component (a) is 2(N-methylcarbamoyl)ethyl acrylate; said component (b) is the reaction product of isophorone diisocyanate, 2-aminoethanol and 2-hydroxyethyl acrylate; and said component (c) is neopentyl glycol diacrylate.

9. A composition as claimed in claim 1, wherein said component (a) is 2(N-methylcarbamoyl)ethyl acrylate; said component (b) is the reaction product of trimethylhexamethylene diisocyanate, 2-aminoethanol and 2-hydroxyethyl acrylate; said component (c) is neopentyl glycol diacrylate and said component (d) is a mixture of isodecyl acrylate and 2-hydroxyethyl acrylate.

10. A composition as claimed in claim 1, wherein said component (a) is 2(N-methylcarbamoyl)ethyl acrylate; said component (b) is the reaction product of tolylene diisocyanate, 2-hydroxyethyl acrylate and the polycaprolactone triol having an average molecular weight of about 540 obtained by the reaction of epsilon-caprolactone with glycerol; said component (c) is neopentyl glycol diacrylate and said component (d) is a mixture of 2-hydroxyethyl acrylate and 2-ethylhexyl acrylate.

11. A composition as claimed in claim 1, wherein said component (a) is 2(N-methylcarbamoyl)ethyl acrylate; and said component (b) is the reaction product of trimethylhexamethylene diisocyanate, 2-hydroxyethyl acrylate and the polycaprolactone triol having an average molecular weight of about 540 obtained by the reaction of epsilon-caprolactone with glycerol.

* * * * *